C. O. SEAMANS.
Potato-Diggers.

No. 200,769.  Patented Feb. 26, 1878.

WITNESSES:
H. Rydquist
J. H. Scarborough

INVENTOR:
C. O. Seamans
BY Munn & Co
ATTORNEYS.

N. PETERS, PHOTO-LITHOGRAPHER, WASHINGTON, D. C.

UNITED STATES PATENT OFFICE.

CHARLES O. SEAMANS, OF CHESTERTON, INDIANA.

IMPROVEMENT IN POTATO-DIGGERS.

Specification forming part of Letters Patent No. 200,769, dated February 26, 1878; application filed June 25, 1877.

*To all whom it may concern:*

Figure 1:
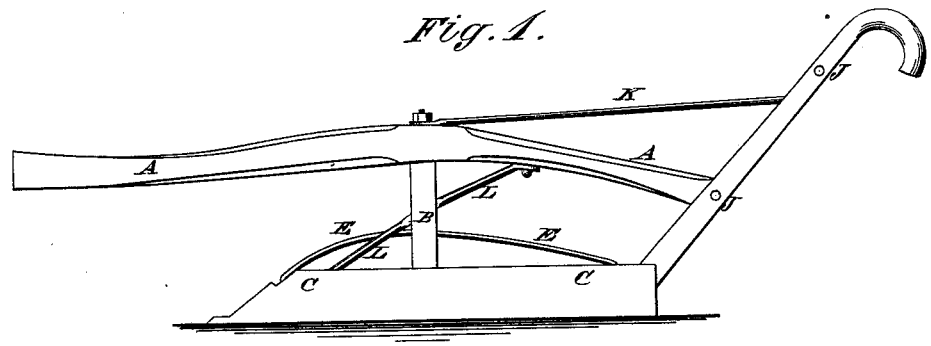
Figure 2:
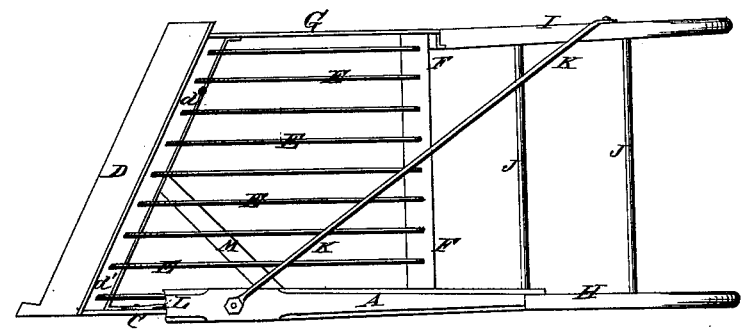

Be it known that I, CHARLES OLNEY SEAMANS, of Chesterton, in the county of Porter and State of Indiana, have invented a new and useful Improvement in Potato-Diggers, of which the following is a specification:

Figure 1 is a side view of my improved machine. Fig. 2 is a top view of the same.

Similar letters of reference indicate corresponding parts.

The object of this invention is to furnish an improved machine for digging potatoes, separating them from the soil, and leaving them upon the top of the soil, ready to be gathered, and which shall be simple in construction, convenient in use, effective in operation, and inexpensive in manufacture.

The invention will first be described in connection with the drawings, and then pointed out in the claim.

A is the beam; B, the standard; C, the land-side, and D the share, which parts are similar to the corresponding parts of an ordinary plow, except that the share is made longer, so as to make a cut about two feet wide.

Upon the rear part of the share D is formed, or to it is attached, a flange or plate, $d'$, to which are attached the forward ends of a series of rods, E, which are slightly arched, and are arranged parallel with each other and with the land-side C. The rear ends of the rods E are attached to a bar, F. The outer end of bar F is attached to the rear end of a bar, G, the forward end of which is attached to the outer end of the share D.

To the rear end of the land-side C and the inner end of the bar F, and to the rear end of the beam A, is attached the lower end of the handle H, and to the outer end of the bar F and the rear end of the bar G is attached the lower end of the handle I.

The handles H I are connected by the rounds J, and are strengthened by the brace K, the rear end of which is attached to the upper part of the handle I, and its forward end is attached to the beam A.

The machine is further strengthened by the braces L and M. The forward end of the brace L is attached to the forward part of the land-side C. Its middle part is attached to the standard B, and its rear end is attached to the beam A. The forward end of the brace M is attached to the lower side of the middle part of the share D, and its rear end is attached to the middle part of the land-side C.

In using the machine, it is drawn forward at such a depth in the ground as to pass beneath the potatoes, and as it is drawn forward the soil drops through the spaces between the rods E, and the potatoes pass off the rear ends of the rods E and fall upon the top of the soil, ready to be gathered.

Having thus described my invention, I claim as new and desire to secure by Letters Patent—

An arched sifter, $d'$ E F G, in combination with a skeleton-plow, whose land-side is connected with share by brace M, and with beam by brace L and post B, the arch of sifter being thus allowed to rise, as shown and described.

CHARLES OLNEY SEAMANS.

Witnesses:
ELIJAH R. SWARTZ,
JENKEN F. TAYLOR.